(12) United States Patent
Bouttier

(10) Patent No.: US 10,715,366 B2
(45) Date of Patent: Jul. 14, 2020

(54) SUB-BAND BASED COMPOSITE DIGITAL TIME DOMAIN SIGNAL PROCESSING

(71) Applicant: MITSUBISHI ELECTRIC CORPORATION, Tokyo (JP)

(72) Inventor: Arnaud Bouttier, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/485,948

(22) PCT Filed: Feb. 26, 2018

(86) PCT No.: PCT/JP2018/008190
§ 371 (c)(1),
(2) Date: Aug. 14, 2019

(87) PCT Pub. No.: WO2018/186079
PCT Pub. Date: Oct. 11, 2018

(65) Prior Publication Data
US 2020/0021473 A1 Jan. 16, 2020

(30) Foreign Application Priority Data
Apr. 7, 2017 (EP) ..................................... 17305422

(51) Int. Cl.
*H04L 27/26* (2006.01)
*H04L 25/02* (2006.01)
*H04L 25/03* (2006.01)

(52) U.S. Cl.
CPC ...... *H04L 27/2605* (2013.01); *H04L 25/0212* (2013.01); *H04L 25/03821* (2013.01); *H04L 25/03828* (2013.01); *H04L 27/2636* (2013.01)

(58) Field of Classification Search
CPC ............ H04L 27/2605; H04L 25/0212; H04L 25/03821; H04L 25/03828; H04L 27/2636; H04L 27/2602; H04L 27/2627
See application file for complete search history.

(56) References Cited

U.S. PATENT DOCUMENTS 9,246,721 B1   1/2016 Martinez
9,363,127 B1 * 6/2016 Guvenkaya ......... H04L 27/2653
(Continued)

FOREIGN PATENT DOCUMENTS

WO   WO 2014/123926 A1   8/2014

OTHER PUBLICATIONS

Qualcomm Incorporated "Waveform Candidates", R1-162199, 3GPP TSG-RAN WG1 #84b, Apr. 11-15, 2016, Busan, Korea, total 26 pages.

*Primary Examiner* — Dac V Ha
(74) *Attorney, Agent, or Firm* — Birch, Stewart, Kolasch & Birch, LLP

(57) ABSTRACT

Embodiments include digital signal processing units, a transmitting device for a wireless communication system and methods of processing a composite time domain signal having a plurality of parallel and independent signals that collectively form a parallel communication. It is proposed a new waveform configuration suitable for 5G and that is able to reduce out-of-band (OOB) emissions which are received on a first time domain signal associated to a first sub-band where the OOB emissions originate from an OFDM time domain signal associated with a second sub-band adjacent to the first sub-band. The proposed solution is partly based on filtered-OFDM with the exception that sub-band filtering is not performed on all the samples of the stream of OFDM (Continued)

symbols. Instead, filtering is performed only, for each OFDM time domain signal, where transition occurs between consecutive OFDM symbols.

15 Claims, 10 Drawing Sheets

(56) References Cited

U.S. PATENT DOCUMENTS

2019/0132169 A1* 5/2019 Zhang .................. H04L 5/0007
2019/0386862 A1* 12/2019 Islam ................ H04W 72/0453

* cited by examiner

SUB-BAND BASED COMPOSITE DIGITAL TIME DOMAIN SIGNAL PROCESSING

TECHNICAL FIELD

This invention relates to a digital signal processing unit, a transmitting device for a wireless communication system and a method of processing a composite time domain signal having a plurality of parallel and independent signals that collectively form a parallel communication.

BACKGROUND ART

To support the increased diversity of the future services to be provided by 5G networks, a recently waveform configuration known as filtered-OFDM (filtered Orthogonal Frequency Division Multiplex) has been proposed.

Filtered-OFDM is said to allow a flexible time-frequency arrangement/allocation as opposed to the uniform distribution required by OFDM in 4G long-term evolution networks (LTE). Filtered-OFDM splits up the bandwidth assigned to a given wireless operator into several sub-bands. Further, in each sub-band, a conventional OFDM signal is tailored to suit the needs of a given type of service in accordance with associated channel operating parameters such as the subcarrier spacing, the cyclic prefix length and the transmission time interval.

In other words, each stream of OFDM symbols associated to a given sub-band is isolated and potentially non-orthogonal to other OFDM symbols associated to other sub-bands. The forgoing also means that where different operating parameters are used by OFDM signals of adjacent sub-bands, subcarrier orthogonality between such OFDM signals may generally be broken, thereby generating interferences between adjacent sub-bands.

Such inter sub-band interference is dealt with in filtered-OFDM by using a band-limited filter on each stream of OFDM symbols of each sub-band and which is configured to suppress, or at least reduce below a target level, the out-of-band (OOB) emissions that may exist between adjacent sub-bands.

However, although the filtering approach used in filtered-OFDM provides a high level of out-of-band rejection close to the modulated subcarriers for a given stream of OFDM symbols, it also introduces inter-carrier interference (ICI) which is known to degrade the bit error rate (BER) at the receiver level. Indeed, in filtered-OFDM, filtering is applied on all subcarriers of a given OFDM symbol.

This is not appropriate, as BER is a primary concern in the design of many digital communication systems. Therefore, it would be desirable to have a waveform configuration as effective as filtered-OFDM in terms of OOB rejection, while at the same time being able to minimize the ICI.

SUMMARY OF INVENTION

The present invention provides a digital signal processing unit, a transmitting device for a wireless communication system and a method of processing a composite time domain signal having a plurality of parallel and independent signals that collectively form a parallel communication, as described in the accompanying claims. Specific embodiments of the invention are set forth in the dependent claims. These and other aspects of the invention will be apparent with reference to the embodiments described hereinafter.

Further details, aspects and embodiments of the proposed solution will be described, by way of example only, with reference to the drawings. In the drawings, like or similar reference numbers are used to identify like or functionally similar elements. Elements in the figures are illustrated for simplicity and clarity and have not necessarily been drawn to scale.

DESCRIPTION OF EMBODIMENTS

It is proposed a new waveform configuration suitable for 5G that can reduce out-of-band (OOB) emissions which are received on a first time domain signal associated to a first sub-band where the OOB emissions originate from an OFDM time domain signal associated with a second sub-band adjacent to the first sub-band.

For the sake of understanding, in accordance with FIG. 1, it will be described in brief important aspects of an OFDM transmission chain as used in OFDM 4G long-term evolution networks (LTE) in downlink or in single-carrier frequency division multiple access (SC-FDMA) LTE in uplink, for instance.

Figure 1A:
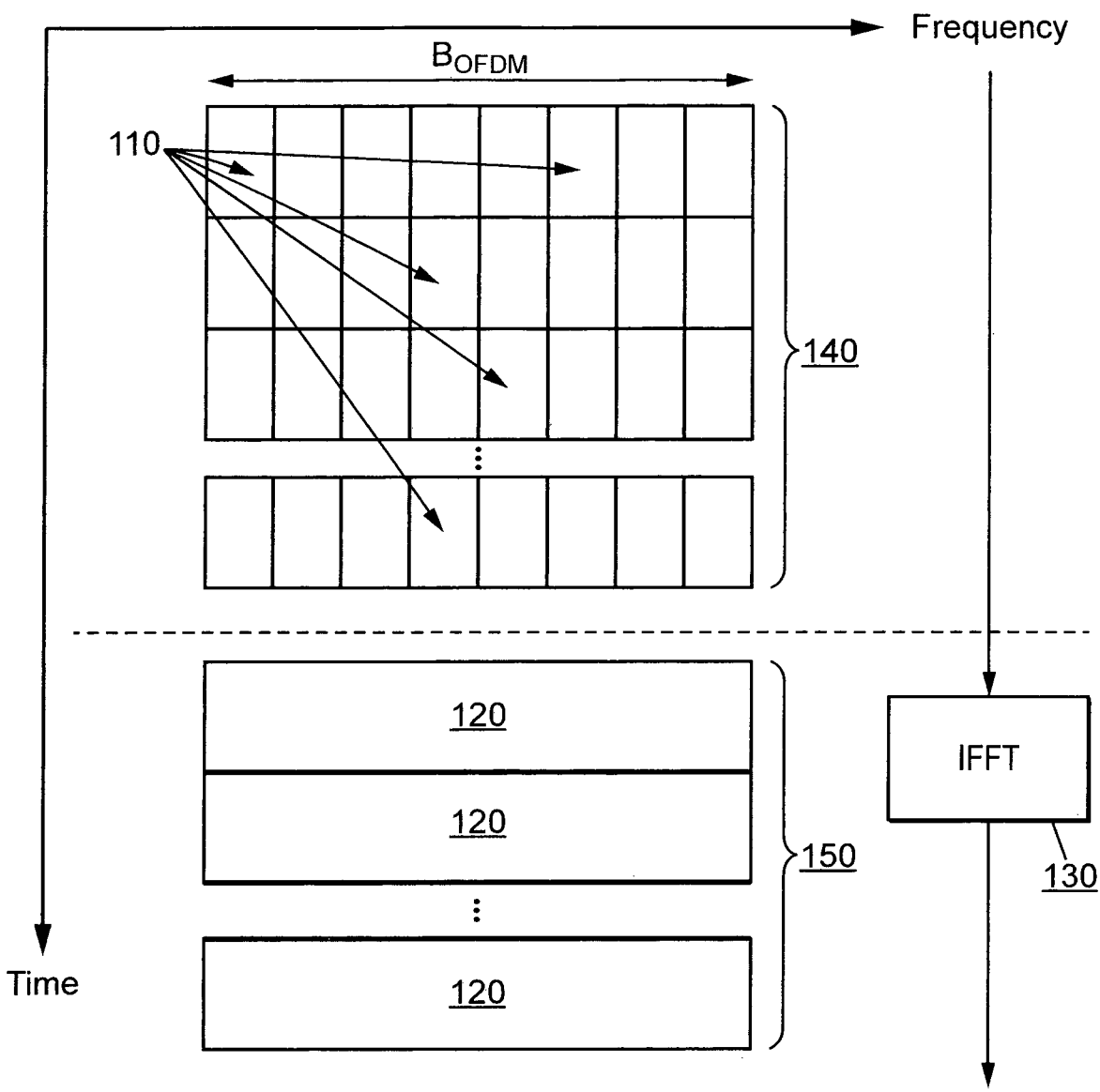
FIG. 1A shows a simplified diagram of part of an OFDM transmission chain.

First, suffice to say that OFDM is a transmission technique that splits a stream of data bits to be transmitted, into lower rate streams which are then transmitted in parallel frequency subcarriers. FIG. 1A shows a plurality of subcarriers 110 which extend over a given frequency band of bandwidth $B_{OFDM}$ and which are said to be orthogonal to each other in the frequency domain. Being orthogonal means that the peak of a subcarrier 110 occurs at the nulls of the other subcarriers 110. Further in OFDM transmission, an OFDM symbol is generated by an Inverse Discrete Fourier Transform (IDFT) which converts the data bits allocated in the plurality of subcarriers 110 from the frequency domain to the time domain. FIG. 1A shows an Inverse Fast Fourier Transform (IFFT) unit 130 which is an implementation of IDFT. FIG. 1A further shows a plurality of consecutive OFDM symbols 120 which have been produced by IFFT unit 130 based on the plurality of subcarriers 110. One should also know that an OFDM symbol 120 may comprise a cyclic prefix (also known as "CP"), to prevent inter-symbol interference between consecutive OFDM symbols 120 due e.g. to delay spread in the propagation channel. However, the present invention is applicable whether or not the presence of CP.

In the following description, everything that is located above the dashed lined as shown in FIG. 1A, that is, before the IDFT in the transmission chain, will be called a frequency domain signal 140. In contrast, everything that is located below the dashed line in FIG. 1A, that is, after the IDFT in the transmission chain, will be called a time domain signal 150. Finally, FIG. 1B further shows a graph 160 plotting the spectral occupancy of the exemplary OFDM time domain signal 150.

Still for the sake of understanding, important aspects of a filtered-OFDM transmission chain as envisioned for 5G networks will be described in brief in accordance with FIG. 2A.

First, one should note that filtered-OFDM divides the whole bandwidth allocated to a given system into several sub-bands. FIG. 2A shows a filtered-OFDM configuration extending over a given frequency band of bandwidth $B_{F\text{-}OFDM}$ which has been divided into two sub-bands, respectively, by sub-band mapping unit 270a and sub-band mapping unit 270b. The first sub-band exhibits a bandwidth $B_1$ and the second sub-band exhibits a bandwidth $B_2$, where the sum of $B_1$ with $B_2$ is smaller or equal to $B_{F\text{-}OFDM}$.

Figure 1B:
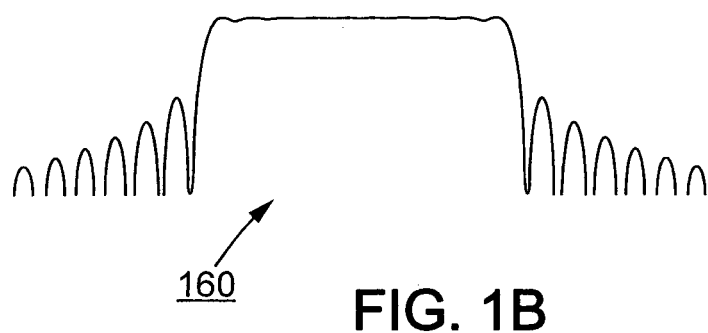
FIG. 1B shows a spectral representation of an OFDM signal.

For clarity of description, description will be omitted for elements having similar references to those already described regarding FIG. 1A and FIG. 1B. It is just necessary to note that indices a and b have been respectively appended to elements associated with the first sub-band and the second sub-band.

Figure 2A:
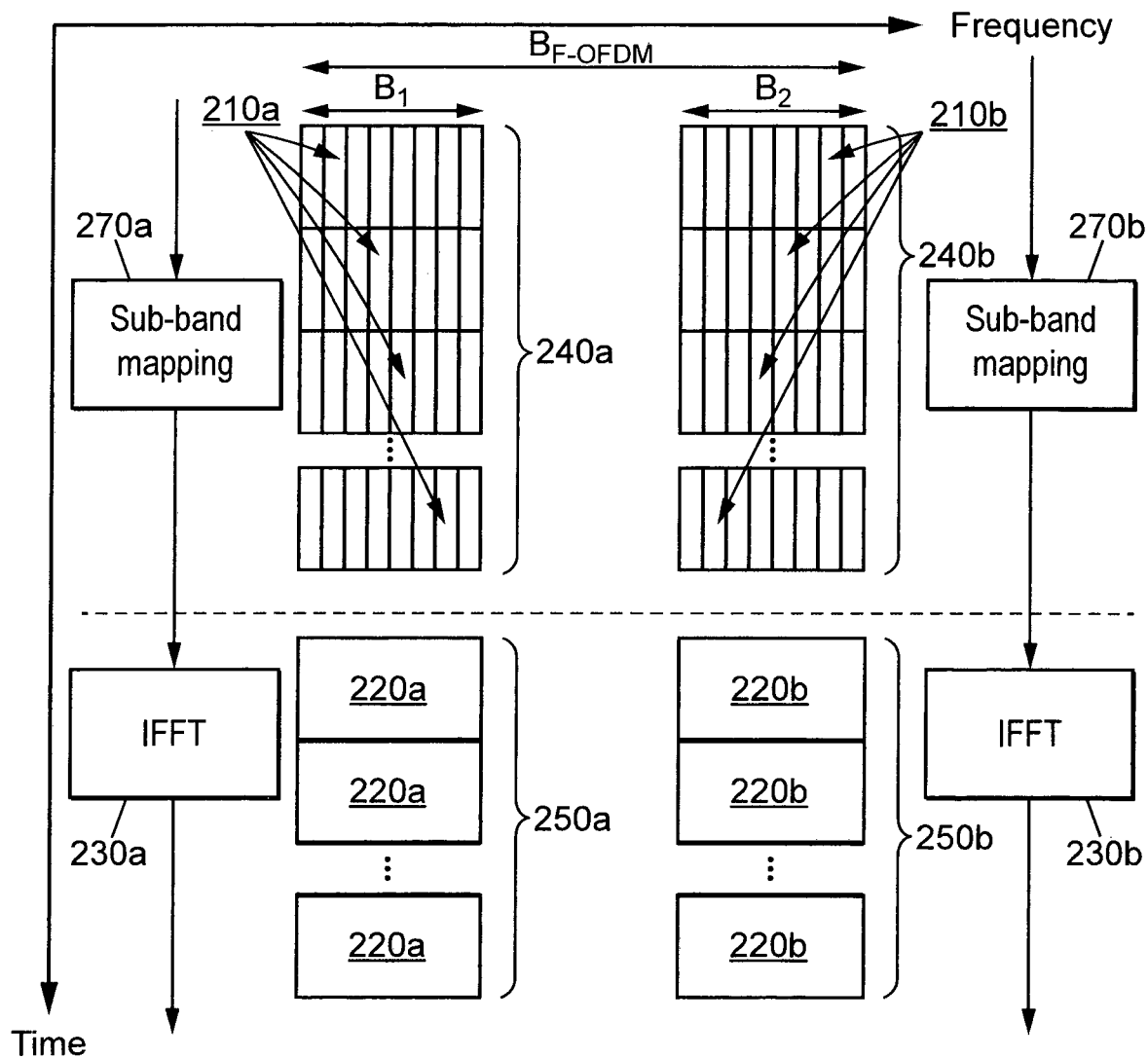
FIG. 2A shows a simplified diagram of part of a filtered-OFDM transmission chain with homogeneous operating parameters of the sub-bands.
Figure 2B:
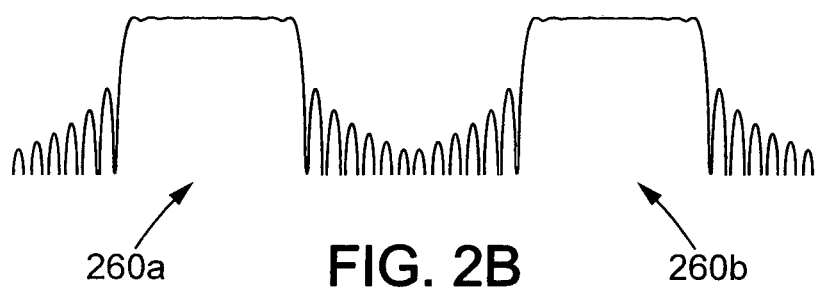
FIG. 2B shows a spectral representation of OFDM signals.

In the example of FIG. 2A, OFDM time domain signals 250a and 250b exhibit the same operating parameters. The term operating parameters (also referred to as "numerology") corresponds to the parameters used to define a waveform transmission. For instance, the operating parameters comprise the sub-carrier spacing, the length of a cyclic prefix, the length of an OFDM symbol, the number of symbols contained in a Transmission Time Interval, and the duration of the TTI in milliseconds.

One of the underlying problems solved by the invention occurs where different operating parameters are used for OFDM time domain signals respectively associated to sub-bands which are adjacent in the frequency domain.

One should note that such configuration is envisioned in 5G networks. For example, in 5G networks, to provide ultra-low latency and high reliability for vehicle-to-vehicle communication, the TTI duration may be shortened while the subcarrier spacing of OFDM is enlarged, as compared with the OFDM numerology used in 4G LTE. Similarly, to enable sufficient coverage with low power consumption for internet-of-things, a tailored single-carrier waveform may be included, with possibly a small frequency occupation (thereby increasing the transmit power density and overcoming the penetration loss) and a long TTI duration (thereby exploiting the quasi-static channel for transmission reliability).

Figure 3A:
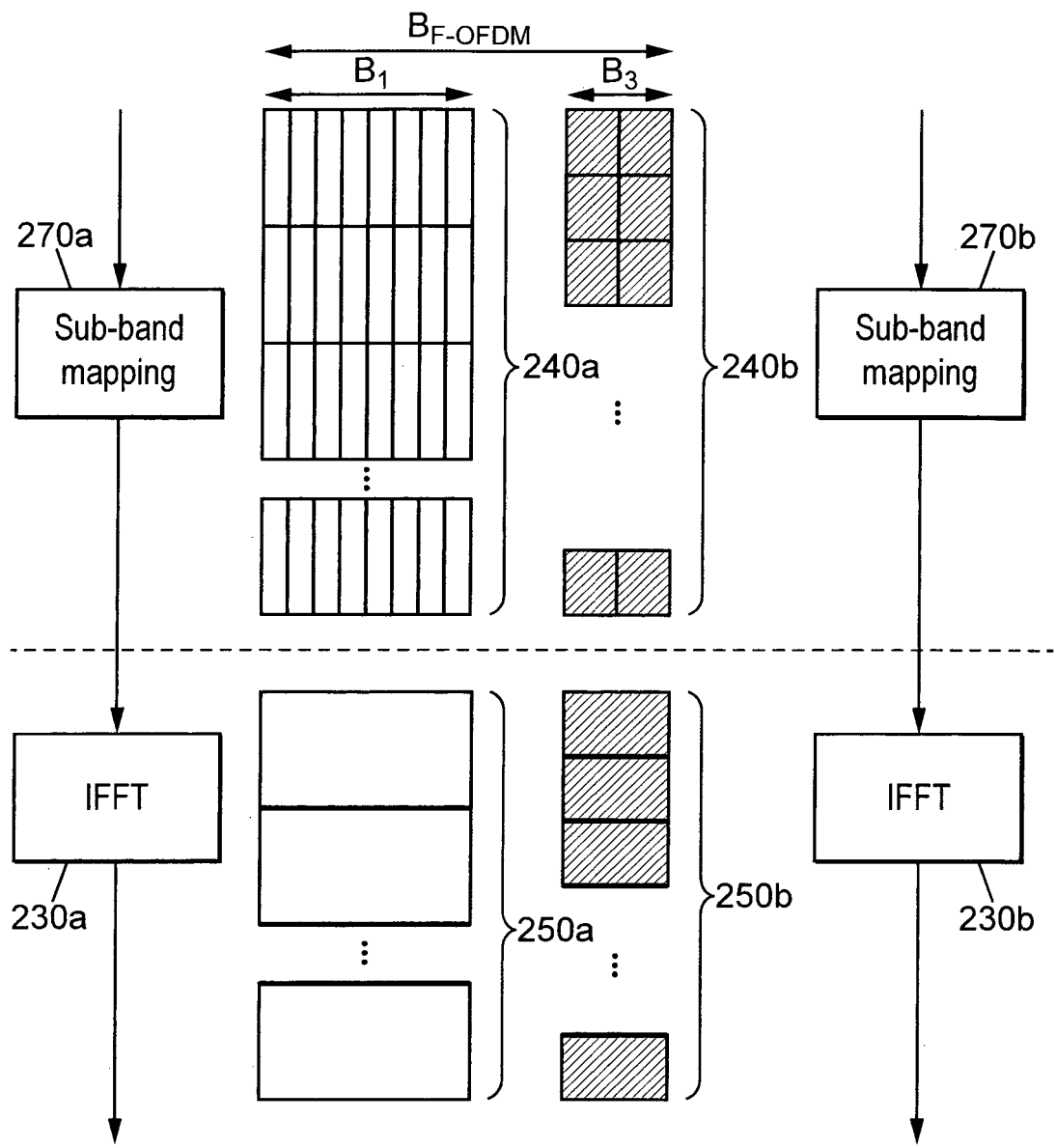
FIG. 3A shows a simplified diagram of part of a filtered-OFDM transmission chain with heterogeneous operating parameters of the sub-bands.
Figure 3B:
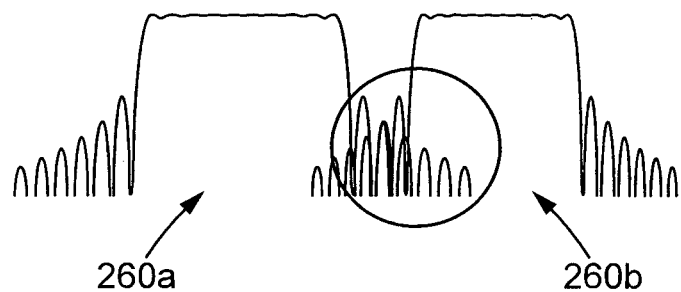
FIG. 3B shows a spectral representation of OFDM signals.

FIG. 3A illustrates such situation where OFDM time domain signals 250a and 250b are respectively associated to OFDM frequency domain signals 240a and 240b which exhibit different channel spacing of the subcarriers. In the example of FIG. 3A, the channel spacing of OFDM frequency domain signal 240a is shorter than that of OFDM frequency domain signal 240b. The foregoing has the effect that inter sub-band interference is experienced since OFDM frequency domain signals 240a and 240b are respectively associated with adjacent sub-bands $B_1$, and $B_3$. Such interference corresponds to the power radiating as circled, in FIG. 3B, in the graphs 260a and 260b respectively plotting the spectral occupancy of OFDM time domain signals 250a and 250b.

Figure 4A:
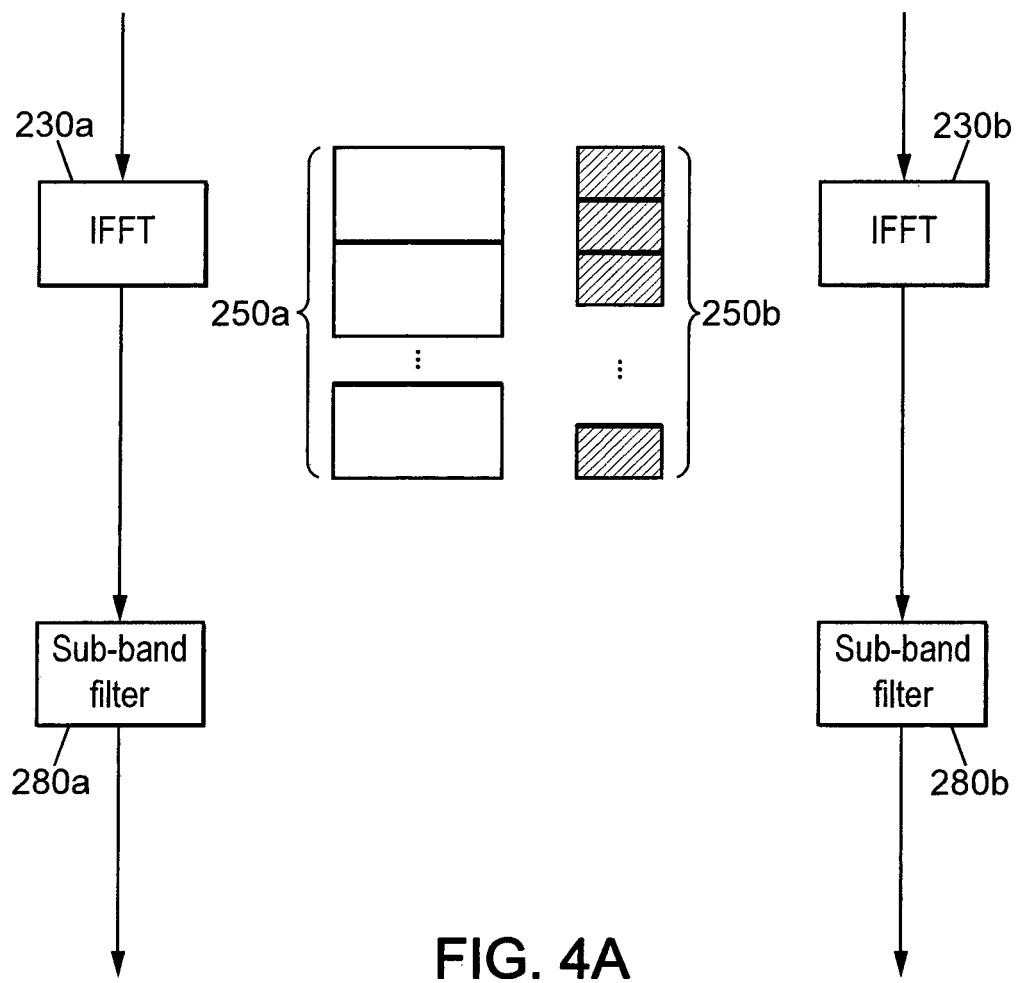
FIG. 4A shows a simplified diagram of part of FIG. 3A with sub-band filtering.
Figure 4B:
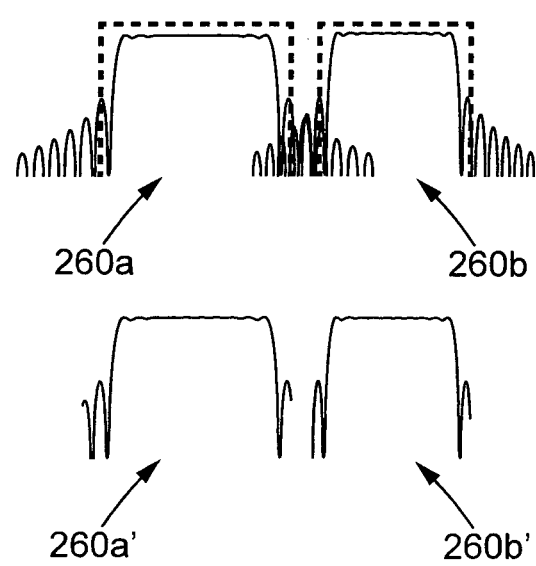
FIG. 4B shows a spectral representation of OFDM signals.

Filtered-OFDM proposes to solve the foregoing problem, by having every sub-band being filtered by a specific filter. Namely, filtered-OFDM requires that each stream of OFDM symbols associated with a given sub-band is filtered by a respective spectrum specific filter. In an example, at a given moment in time, the spectrum shaping filter is centered in frequency at the subcarriers assigned to an OFDM symbol of the stream of OFDM symbols, and its bandwidth is equal to the total frequency width assigned to the subcarriers associated to the OFDM symbol. FIG. 4A shows OFDM time domain signals 250a and 250b which are to be respectively filtered by sub-band filter units 280a and 280b so as to generate filtered-OFDM time domain signals (not shown). FIG. 4B shows, in the frequency domain, the graphs 260a' and 260b' respectively plotting the spectral occupancy of the filtered-OFDM time domain signals associated to OFDM time domain signals 250a and 250b. FIG. 4B further shows, in dashed line, the focus of filtered-OFDM which is directed to OFDM time domain signals 250a and 250b as a whole.

As already explained above such solution is not appropriate since it introduces inter-carrier interference (ICI) which is known to degrade the bit error rate (BER) at the receiver level.

Therefore, the subject application proposes an alternative solution which alleviates such disadvantage. The proposed solution is partly based on filtered-OFDM with the exception that sub-band filtering is not performed on all the samples of the stream of OFDM symbols. Instead, filtering is performed only, for each OFDM time domain signal, where transition occurs between consecutive OFDM symbols. In other words, filtering is applied only over the boundaries between consecutive OFDM symbols. Hence, contrary to filtered-OFDM, where all samples associated to an OFDM signal are filtered, the proposed solution considers only for filtering, the samples located at the boundaries between consecutive OFDM symbols.

Indeed, it has been found that OOB emissions originating from an OFDM time domain signal associated to a first sub-band and perceived as interference by a time domain signal (being OFDM-based or not) associated to a second sub-band adjacent to the first sub-band, results from the occurrence of sharp transitions (i.e. high frequencies) between consecutive OFDM symbols of the OFDM time domain signal.

Figure 5A:
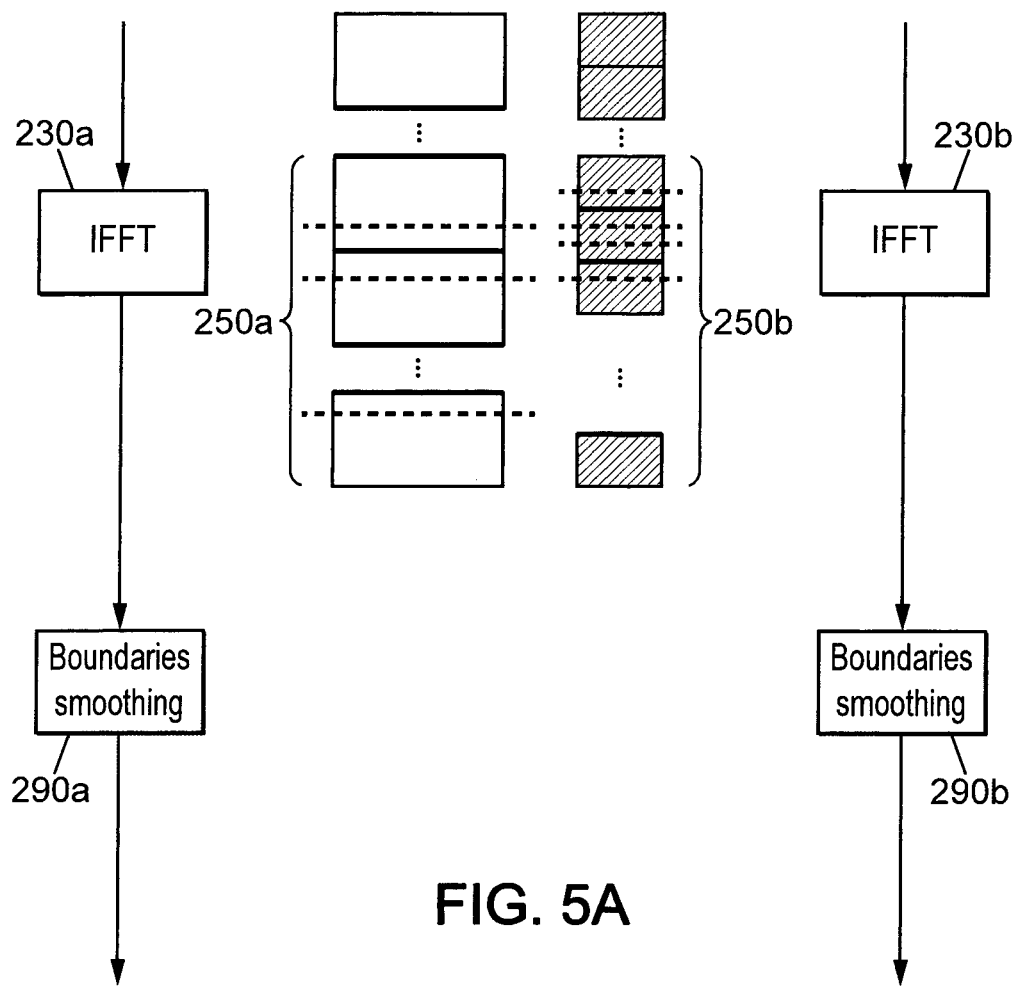
FIG. 5A shows a simplified diagram of part of FIG. 3A with a filtering mechanism in accordance with the subject application.
Figure 5B:
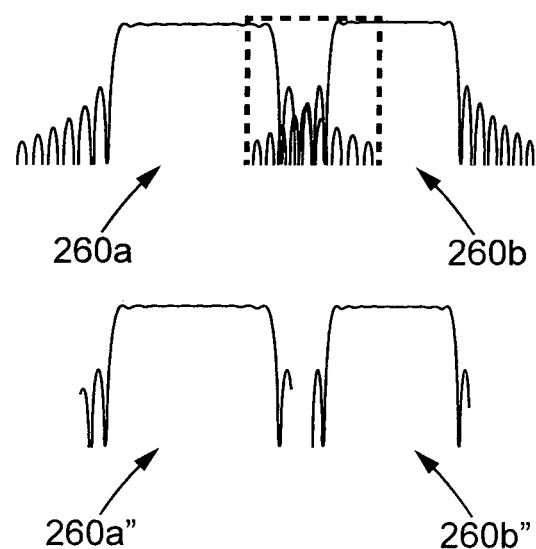
FIG. 5B shows a spectral representation of OFDM signals.

FIG. 5A shows OFDM time domain signals 250a and 250b which are to be respectively filtered at the boundaries between OFDM symbols by boundaries smoothing units 290a and 290b in accordance with the invention. In the time domain, said OFDM time domain signals 250a and 250b comprise a stream of OFDM signals with a sharp transition from an OFDM symbol to the subsequent one. FIG. 5B shows the graphs 260a" and 260b" respectively plotting the spectral occupancy of the OFDM time domain signals associated to OFDM time domain signals 250a and 250b, as processed in accordance with the invention. FIG. 5B further shows, in dashed line, the focus of the invention which is directed only to part OFDM time domain signals 250a and 250b where OOB is considered to originate from.

Some embodiments of the invention will now be described with respect to FIGS. 6 to 10. These specific embodiments are provided just as examples, and the invention is not limited thereto.

Figure 6:
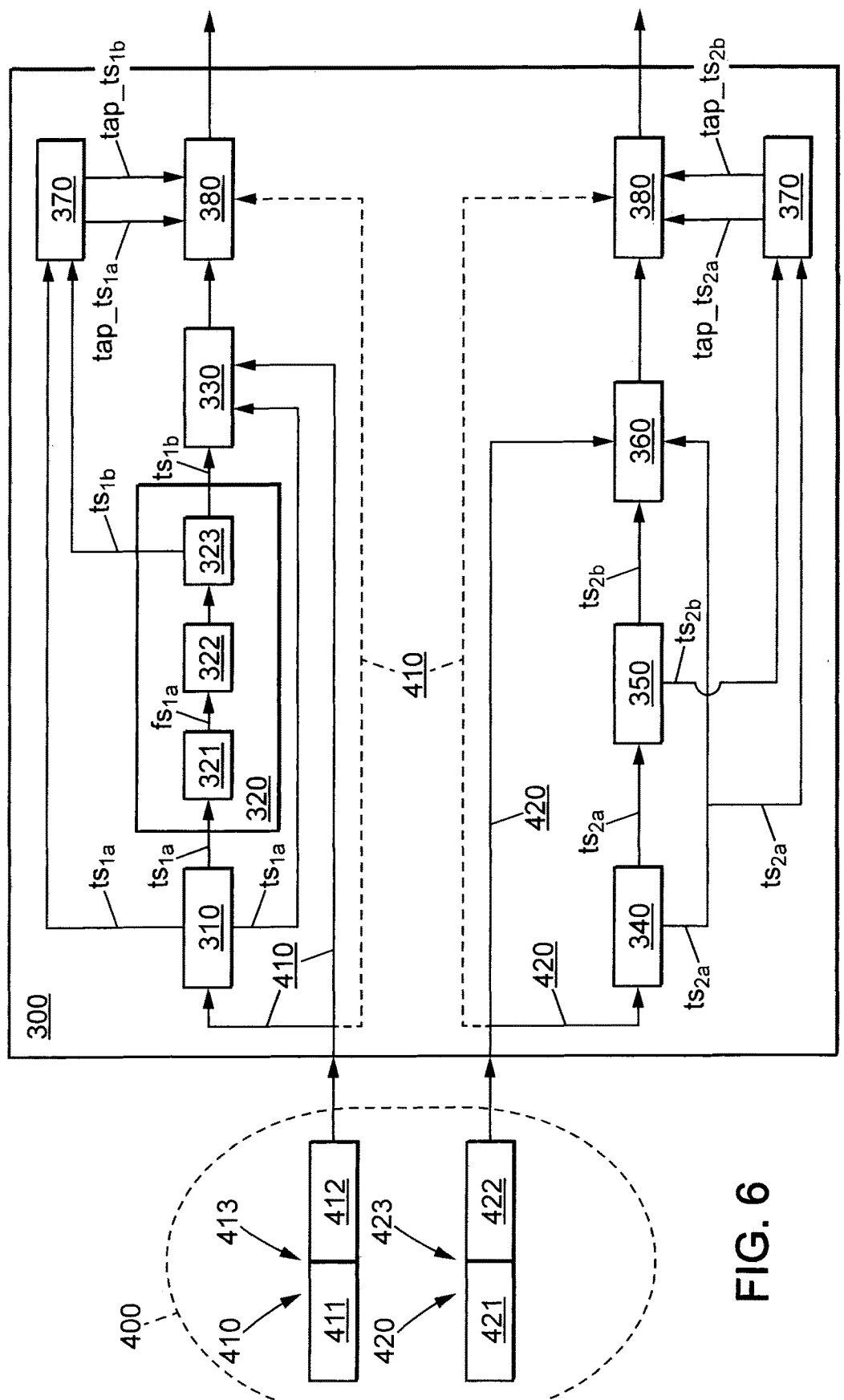
FIG. 6 is a block diagram illustrating a digital signal processing unit 300 in accordance with embodiments of the subject application.

In a first embodiment of the subject application, in accordance with FIG. 6, it is disclosed a digital signal processing unit 300. In an example, digital signal processing unit 300 may be a processor-based computing device, a personal computer, server or other computing systems (e.g. an Application-Specific Integrated Circuit-ASIC or a Field Programmable Gate Array-FPGA). Digital signal processing unit 300 is configured for processing a composite time domain signal 400. Composite time domain signal 400 comprises a plurality of parallel and independent signals that are arranged to collectively form a parallel communication. In the example of FIG. 6, composite time domain signal 400 comprises at least a first time domain signal 410 and a second time domain signal 420. Of course, in other embodiments, composite time domain signal 400 may comprise more than two time domain signals. First time domain signal 410 is like OFDM time domain signals 250a or 250b as already described above. In the example of FIG. 6, first time domain signal 410 is formed by at least a first OFDM symbol 411 and a second OFDM symbol 412 which are contiguous to each other at a first transition time boundary 413. Second time domain signal 420 may be associated to any type of waveform that is not necessarily OFDM-based. For example, a single carrier waveform may be associated to time domain signal 420 without departing from the scope of the first embodiment of the subject application.

Put in other words, composite time domain signal 400 corresponds to a time domain representation of a composite frequency domain signal extending over a given frequency band configured to be associated with the parallel communication. In addition, the given frequency band is arranged into at least a first frequency sub-band and a second frequency sub-band which are adjacent to each other and which are respectively associated with first time domain 410 signal and second time domain signal 420.

In the example of FIG. 6, digital signal processing unit 300 comprises a first extracting unit 310, a first filtering unit 320 and a first replacing unit 330. As shown in FIG. 6, first filtering unit 320 is operably coupled to first extracting unit 310 and first replacing unit 330. Also, first extracting unit 310 is operably coupled to first replacing unit 330.

When digital signal processing unit 300 is in operation, first extracting unit 310 extracts a predetermined plurality of time domain samples $ts_{1a}$ of first time domain signal 410 which are located on either side of first transition time boundary 413. In general, this would correspond to selecting a few tens of information periods, where an information period corresponds to the inverse of the associated signal bandwidth defined by the number of modulated subcarriers. In that case, the information period is independent from any given oversampling factor which may be used for further filtering where for instance oversampling is obtained by introducing null subcarriers on the edges of the modulated subcarriers prior OFDM modulation. In an example, the information period is equal to the time domain sample period and first extracting unit 310 extracts few tens of time domain samples, such as 10, 15 or 20 time domain samples. In a preferred embodiment, first extracting unit 310 extracts a same number of time domain samples on either side of first transition time boundary 413. In another preferred embodiment, first extracting unit 310 extracts a different number of time domain samples on either side of first transition time boundary 413.

Further in operation of digital signal processing unit 300, first filtering unit 320 filters extracted time domain samples $ts_{1a}$, thereby creating filtered time domain samples $ts_{1b}$.

According to the invention, digital filtering may be performed in either time domain or frequency domain. Furthermore, it is possible to use different types of filters such as Finite Impulse Response (FIR) filters or Infinite Impulse Response (IIR) filters.

In an example, as illustrated in FIG. 6, filtering is performed in the frequency domain. Namely, first filtering unit 320 further comprises a first converting unit 321, a filtering unit 322 and a second converting unit 323. As shown in FIG. 6, filtering unit 322 is operably coupled to first converting unit 321 and second converting unit 323. When first filtering unit 320 is in operation, first converting unit 321 converts extracted time domain samples $ts_{1a}$ from the time domain to the frequency domain with a discrete Fourier transform (DFT) thereby creating frequency domain samples $fs_{1a}$. Further, filtering unit 322 filters frequency domain samples $fs_{1a}$. Finally, second converting unit 323 converts the filtered frequency domain samples from the frequency domain to the time domain with an inverse discrete Fourier transform, IDFT, thereby creating filtered time domain samples $ts_{1b}$. In an example, DFT/IDFT operations are performed according to FFT/IFFT algorithms.

Figure 7:
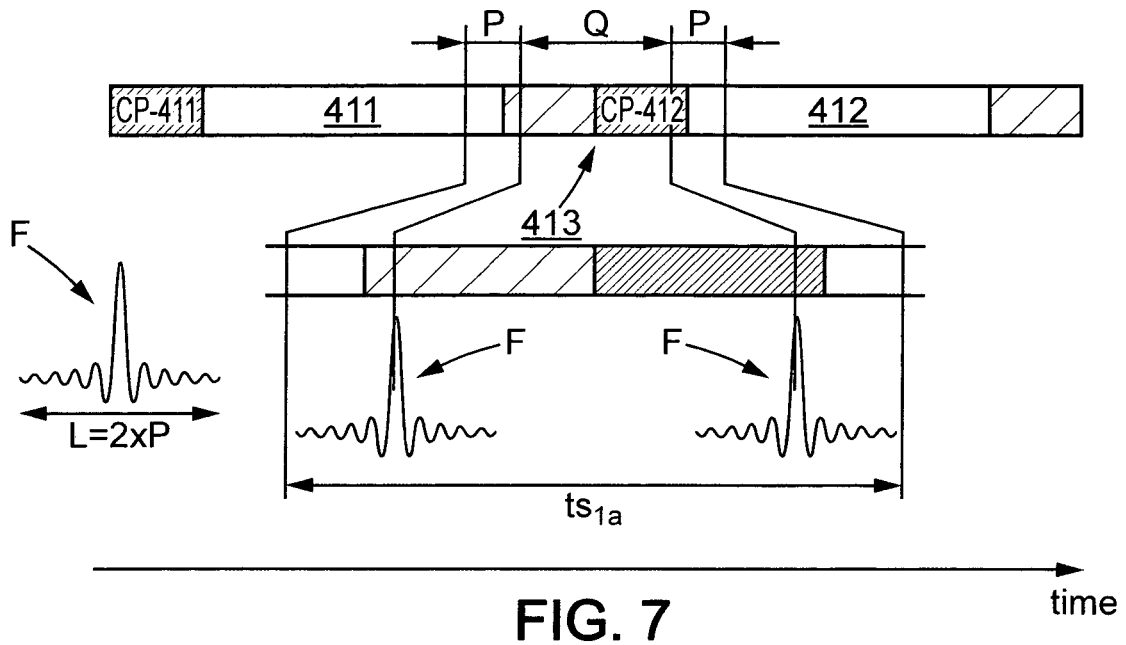
FIG. 7 is a simplified diagram of an exemplary arrangement of the extracted time domain signals which is suitable for a filtering unit operating in the time domain and based on a FIR filter.

In another implementation as shown in FIG. 7, filtering is performed in the time domain filtering with a FIR filter. In the example of FIG. 7, extracted time domain samples $ts_{1a}$ are arranged into a first and a second group of time domain samples. The first group may comprise a number Q of time domain samples located around first transition time boundary 413 while the second group may comprise a number P of time domain samples located on both sides of the first group. With such configuration, FIR filter F may use a tap length L equal to two times the size P to simultaneously filter the first and a second group of time domain samples. This arrangement has the effect of minimizing the complexity of first filtering unit 320 in comparison with filtered-OFDM. Indeed, with the proposed configuration, fewer samples are taken into consideration such that the number of complex multiplications required for each OFDM symbol is limited. In addition, one should note that the filtered time domain samples of the first group are correlated to the time domain samples of the second group as the impulse response of filter F extends over the time domain samples of the second group.

Referring back to FIG. 6, in operation of digital signal processing unit 300, replacing unit 330 replaces, in first time domain signal 410, extracted time domain samples $ts_{1a}$ with filtered time domain samples $ts_{1b}$.

Said first embodiment has the effect of reducing OOB emissions experienced on second time domain signal 420 and originating from first time domain signal 410 where OOB emissions are due to abrupt transitions between consecutive OFDM symbols associated with first time domain signal 410. In addition, inter-carrier interference (ICI) is reduced since few time domain symbols are being filtered. Hence, ICI is limited to a limited portion of from first time domain signal 410.

Figure 8:
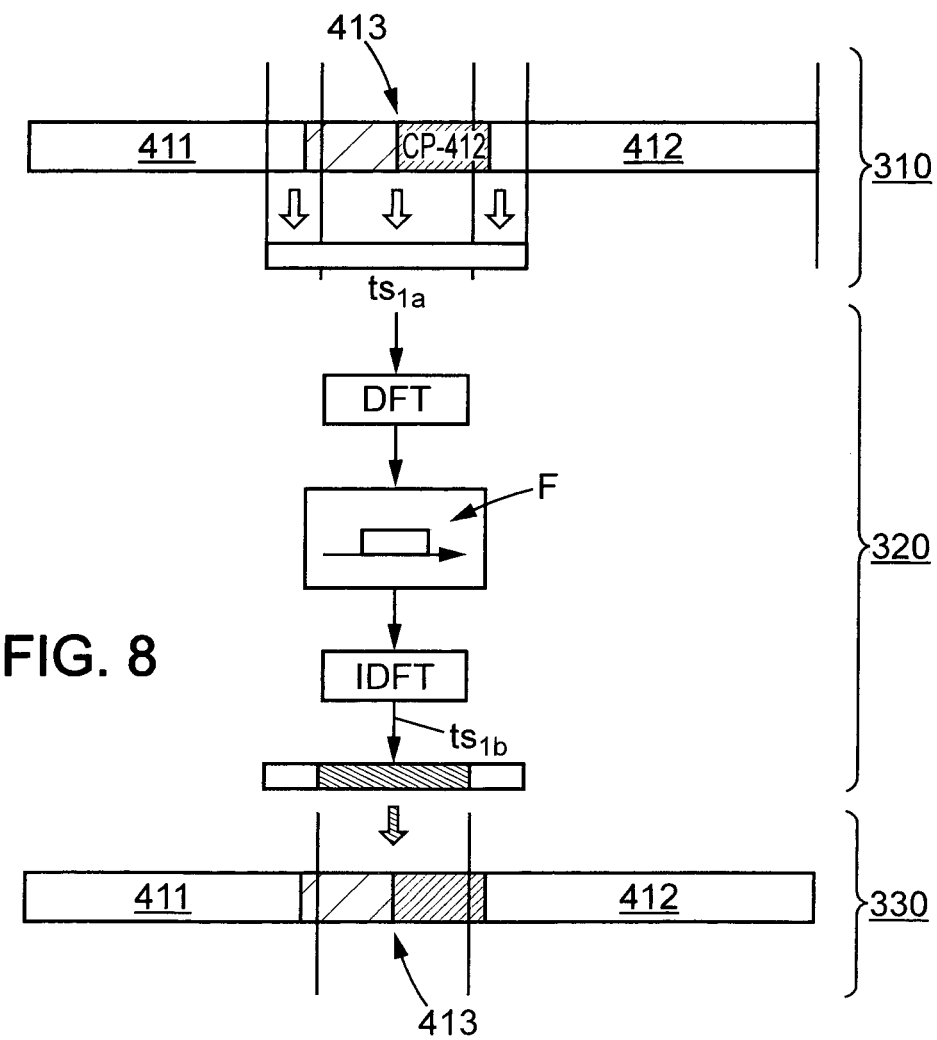
FIG. 8 is an alternative representation of the operations of FIG. 6 with a filtering unit operating in the frequency domain.

For the sake of completeness, referring to FIG. 8, there is shown an alternative representation of the operations of digital signal processing unit 300, where filtering is performed in the frequency domain. In FIG. 8, "CP" stands for cyclic prefix as already explained above.

Referring again to FIG. 6, in a preferred arrangement of the first embodiment, composite frequency domain signal 400 is a multicarrier signal formed by a plurality of subcarriers and second time domain signal 420 is an OFDM signal comprising a first OFDM symbol 421 and a second OFDM symbol 422 which are contiguous to each other at a second first transition time boundary 423. Further, first time domain signal 410 and second time domain signal 420 exhibit at least one different operating parameter. In an example, the operating parameter comprises at least one of: a subcarrier spacing, a cyclic prefix length, a sub-frame duration, a transmission time interval and a fast Fourier transform length. In another embodiment, first time domain signal 410 and second time domain signal 420 exhibit the same operating parameter but are not synchronized in time.

As shown is FIG. 6 digital signal processing unit 300 further comprises a second extracting unit 340, a second filtering unit 350 and a second replacing unit 360 which are like already described first extracting unit 310, first filtering unit 320 and first replacing unit 330. Also, second filtering unit 350 is operably coupled to second extracting unit 340 and second replacing unit 360. In other words, said preferred arrangement comprises two OFDM transmission chains.

In said preferred arrangement of the first embodiment, when digital signal processing unit 300 is in operation, second extracting unit 340 extracts a predetermined plurality of time domain samples $ts_{2a}$ of second time domain signal 420 which are located on either side of second transition time boundary 423. Further in operation, second filtering unit 350 filters extracted time domain samples $ts_{2a}$, thereby creating filtered time domain samples $ts_{2b}$. Later, replacing unit 360 replaces, in second time domain signal 420, extracted time domain samples $ts_{2a}$ with filtered time domain samples $ts_{2b}$.

Said preferred arrangement has the effect of reducing mutual OOB emissions between first time domain signal 410 and second time domain signal 420 where OOB emissions are due to abrupt transitions between consecutive OFDM symbols associated with first time domain signal 410 and second time domain signal 420. In other words, OOB emissions are reduced because, abrupt transitions between consecutive OFDM symbols associated with first time domain signal 410 have been smoothed and that abrupt transitions between consecutive OFDM symbols associated with second time domain signal 420 have also been smoothed.

It has been noticed that, although above-mentioned first embodiment and preferred arrangement, smooths out the transition between OFDM symbols, rather small amplitude breaks are introduced at the boundaries between the original time domain samples and the filtered time domain samples that replace the original samples around the boundaries of first time domain signal 410. These amplitude breaks appear to stem from the replacing in first time domain and/or second time domain signals of the extracted time domain samples with the filtered time domain samples.

To solve this problem, a further improvement is proposed in accordance with FIG. 6.

As shown in FIG. 6, digital signal processing unit 300 further comprises a window shaping unit 370 and an adding unit 380. Window shaping unit 370 is operably coupled to extracting units 310, 340 and filtering units 320, 350. Further, adding unit 380 is operably coupled to window shaping unit 370 and replacing units 330, 360.

When digital signal processing unit 300 is in operation, window shaping unit 370 window shapes with a smooth tapered window function W, in the time domain, filtered time domain samples $ts_{1b}$, $ts_{2b}$, thereby creating first tapered time domain samples $tap\_ts_{1b}$, $tap\_ts_{2b}$. Further, window shaping unit 370 window shapes with an inverse function of the smooth tapered window function W, in the time domain, extracted time domain samples $ts_{1a}$, $ts_{2a}$ thereby creating second tapered time domain samples $tap\_ts_{1a}$, tap_ts2a. Later, adding unit 380 adds in the time domain, first tapered time domain samples $tap\_ts_{1b}$, $tap\_ts_{2b}$ with second tapered time domain samples $tap\_ts_{1a}$, $tap\_ts_{2a}$, thereby creating combined tapered time domain samples $tap\_t_{s1}$, $tap\_t_{s2}$.

In an example, adding units 380 performs the adding according to a weighting principle as illustrated by the following formula: $x_b(t) \times w(t) + x_a(t) \times (1-w(t))$ where $x_b(t)$ correspond to the first tapered time domain samples $tap\_ts_{1b}$, $tap\_ts_{2b}$, $x_a(t)$ corresponds to the second tapered time domain samples $tap\_ts_{1a}$, $tap\_ts_{2a}$ and w(t) corresponds to the smooth tapered window function W.

Finally, replacing units 330, 360 replace, in the first time domain signal and/or the second time domain signal, filtered time domain samples $ts_{1b}$, $ts_{2b}$ with combined tapered time domain samples $tap\_ts_1$, $tap\_ts_2$. In an embodiment, replacing units 330, 360 replace, in the first time domain signal and/or the second time domain signal, extracted time domain samples with combined tapered time domain samples $tap\_ts_1$, $tap\_ts_2$.

In the description, it is understood that a tapered window function is a function that gradually approaches zero at its ends. For such function, there is a trade-off between the width of the main lobe and the maximum level of the side lobes. Further, where a tapered window function is added to its inverse function, the result corresponds to a constant function having the same value (e.g. 1) for every input value. In an example, the smooth tapered window function is symmetrical about the vertical centerline (i.e. the center frequency of the function) and is selected from among the following window functions: root raised-cosine, raised-cosine, trapezoidal, cosine and Tukey.

Said improved arrangement has the effect of reducing the rather small amplitude breaks that are introduced at the boundaries between the original time domain samples and the filtered time domain samples, as already explained above.

Figure 9:
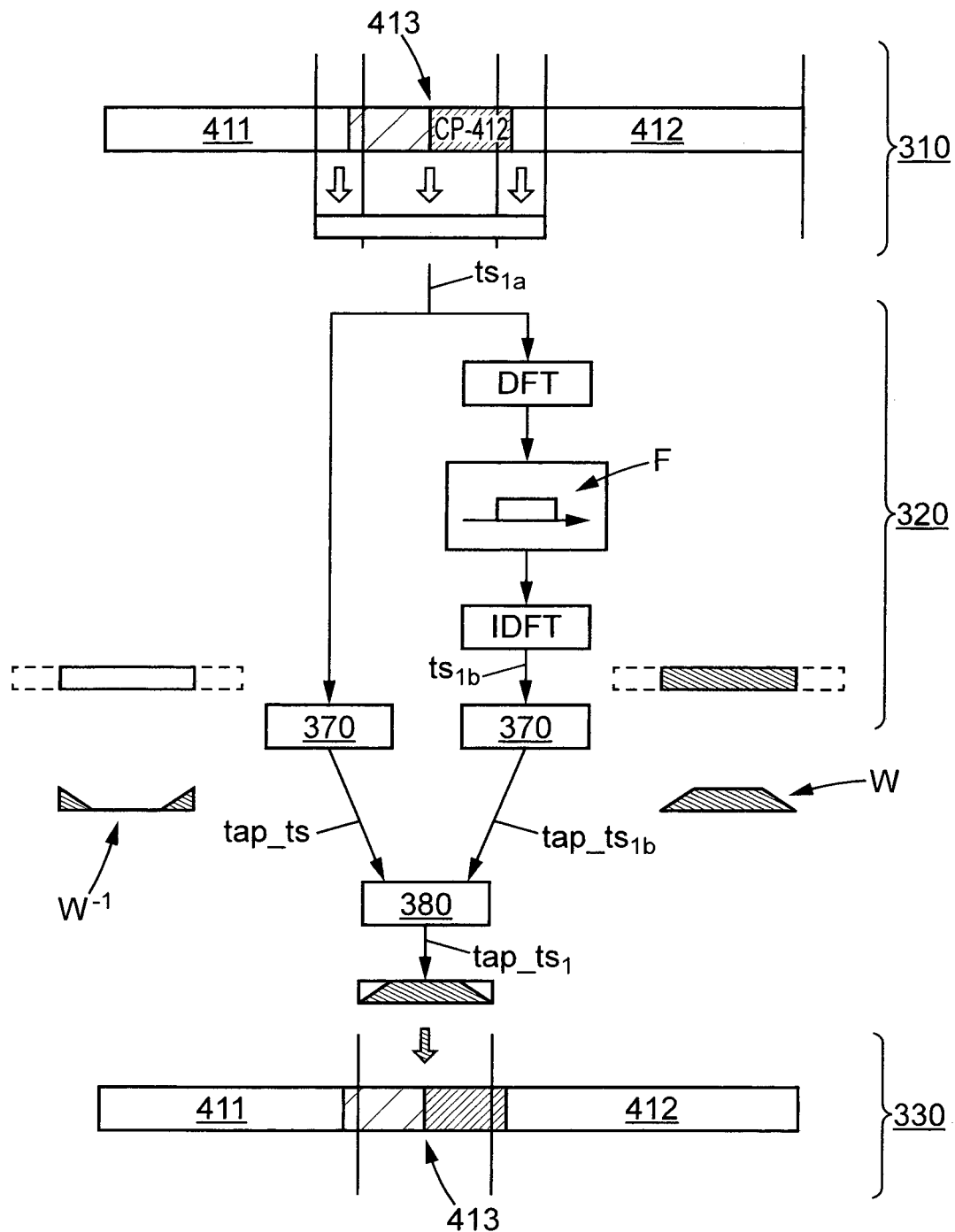
FIG. 9 is an alternative representation of the operations of FIG. 6 in combination with improved embodiments relating to windowing and with FIG. 7.

For the sake of completeness, referring to FIG. 9, there is shown an alternative representation of the operations of digital signal processing unit 300 in conjunction with the above-mentioned improved embodiment and the embodiment of FIG. 7. In the example of FIG. 9, the smooth tapered window function W is a trapezoidal function and filtering is performed in the frequency domain.

Figure 10:
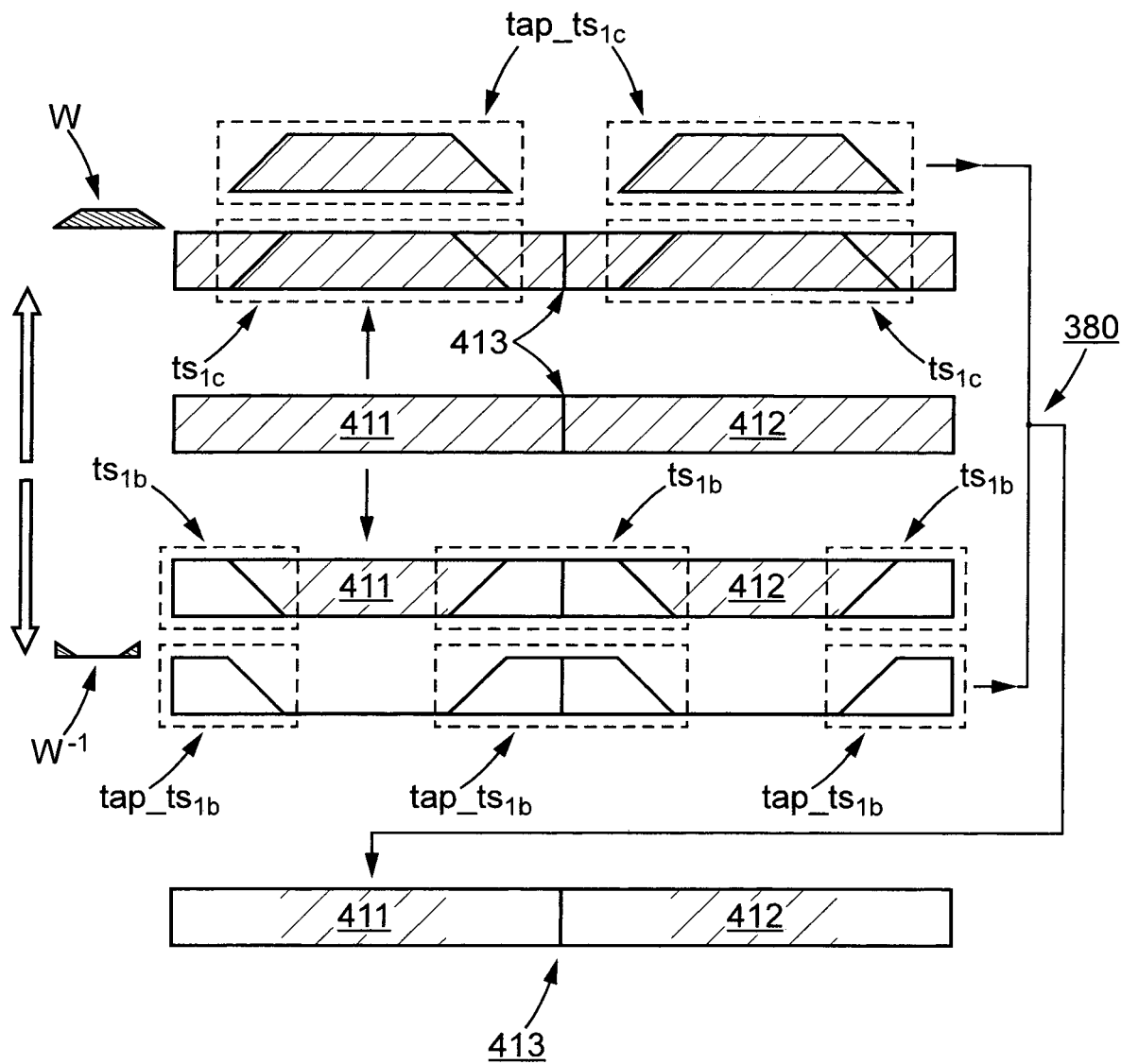
FIG. 10 is an alternative representation of the operations of FIG. 6 in combination with improved embodiments relating to windowing and with FIG. 7.

Still for the sake of completeness, referring to FIG. 10, there is shown another alternative representation of the operations of digital signal processing unit 300 in conjunction with the above-mentioned improved embodiment and the embodiment of FIG. 7. In the example of FIG. 10, the smooth tapered window function W is also a trapezoidal function. However, as opposed to the embodiment of FIG. 9, in FIG. 10, the smooth tapered window function W is centered at the center of the OFDM symbol under study and is applied over the whole length of said OFDM symbol. Further, an inverse function of the smooth tapered window function W is also centered at the center of the OFDM symbol under study and is applied to the filtered time domain samples over the same length.

In the example of FIG. 10, when digital signal processing unit 300 is in operation, extracting unit 310, 340 extracts a predetermined plurality of time domain samples $ts_{1c}$, $ts_{2c}$ of each OFDM symbols 411, 412, 421, 422 associated with an OFDM time domain signal 410, 420. In that embodiment, the extracted time domain samples $ts_{1c}$, $ts_{2b}$ are located on either side of the center of the useful part of each OFDM symbol 411, 412, 421, 422. Further, window shaping unit 370 window shapes with a smooth tapered window function W, in the time domain, extracted time domain samples $ts_{1c}$, $ts_{2c}$, thereby creating second tapered time domain samples $tap\_ts_{1c}$, $tap\_ts_{2c}$. Further again, window shaping unit 370 window shapes with an inverse function of the smooth tapered window function W, in the time domain, filtered time domain samples $ts_{1b}$, $ts_{2b}$, thereby creating first tapered time domain samples $tap\_ts_{1b}$, $tap\_ts_{2b}$. Later, as already explained above, adding unit 380 adds in the time domain, first tapered time domain samples $tap\_ts_{1b}$, $tap\_ts_{2b}$ with second tapered time domain samples $tap\_ts_{1c}$, $tap\_ts_{2c}$, thereby creating combined tapered time domain samples $tap\_ts_1$, $tap\_ts_2$. Finally, replacing units 330, 360 replace, in the first time domain signal and/or the second time domain signal, all the relevant original time domain samples with the combined tapered time domain samples. In the foregoing, all the relevant time domain samples are those associated with a given OFDM symbol. Indeed, as shown in FIG. 10, all time domain samples associated with OFDM symbols 411, 412 are replaced by the combination of second tapered time domain samples $tap\_ts_{1c}$, $tap\_ts_2$, and first tapered time domain samples $tap\_ts_{1b}$, $tap\_ts_{2b}$. In other words, the number of time domain samples associated with combined tapered time domain samples $tap\_ts_1$, $tap\_ts_2$ is equal to the number of time domain samples associated with each of OFDM symbols 411, 412.

The present invention may be embodied in a transmitting device such as those used in wireless communications. Such transmitting device may comprise at least two parallel transmitting chains that are arranged to collectively form a parallel communication wherein at least one of the transmitting chains is an OFDM transmitting chain, and each of the parallel transmitting chain comprises digital signal processing unit 300.

Figure 11:
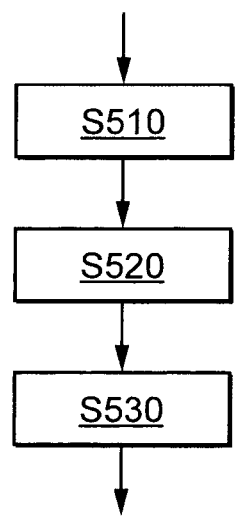
FIG. 11 is a flow chart of processing a composite time domain signal having a plurality of parallel and independent signals that collectively form a parallel communication in accordance with an embodiment of the subject application.

Further, as shown in FIG. 11, embodiments of the proposed solution may also be implemented in a method 500 for processing composite time domain signal 400 as already described above. Such method may include:
at S510, extracting a predetermined plurality of time domain samples of the first time domain signal which are located on either side of the first transition time boundary,
at S520, filtering the extracted time domain samples, thereby creating filtered time domain samples, and
at S530, replacing, in the first time domain signal, the extracted time domain samples with the filtered time domain samples.
In embodiments of the method, the composite frequency domain signal is a multicarrier signal formed by a plurality of subcarriers, as already described above, and the first time domain signal and the second time domain signal exhibit at least one different operating parameter, as also described above. In such case, the method further includes:
extracting a predetermined plurality of time domain samples of the second time domain signal which are located on either side of the second transition time boundary,
filtering the extracted time domain samples, thereby creating filtered time domain samples, and
replacing, in the second time domain signal, the extracted time domain samples with the filtered time domain samples.
In other embodiments of the method, it is further included:
window shaping with a smooth tapered window function, in the time domain, the filtered time domain samples, thereby creating first tapered time domain samples,
window shaping with an inverse function of the smooth tapered window, function, in the time domain, the extracted time domain samples, thereby creating second tapered time domain samples,
adding in a weighted manner, in the time domain, the first tapered time domain samples with the second tapered time domain samples, thereby creating combined tapered time domain samples, and
replacing, in the first time domain signal, the extracted time domain samples or the filtered time domain samples with the combined tapered time domain samples.
In alternative embodiments of the method, it is further included:
extracting all the time domain samples of the first time domain signal and/or second time domain signal,
window shaping with a smooth tapered window function, in the time domain, the extracted time domain samples which are associated to each OFDM symbol, thereby creating second tapered time domain samples,
window shaping with an inverse function of the smooth tapered window function, in the time domain, the filtered time domain samples, thereby creating first tapered time domain samples,
adding in a weighted manner, in the time domain, the first tapered time domain samples with the second tapered time domain samples, thereby creating combined tapered time domain samples,
replacing, in the first time domain signal and/or the second time domain signal, all the time domain samples with the respective combined tapered time domain samples.
In one embodiment of the method, the filtering further comprises:
converting the extracted time domain samples from the time domain to the frequency domain with a discrete Fourier transform, DFT, thereby creating frequency domain samples,
filtering the frequency domain samples,
converting the filtered frequency domain samples from the frequency domain to the time domain with an inverse discrete Fourier transform, IDFT, thereby creating filtered time domain samples.
In embodiments of the previous embodiment, the extracted time domain samples are so arranged to comprise a first and a second group of time domain samples, the first group being located around the first transition time boundary and/or the second transition time boundary and having a size Q, the second group being located on either side of the first group and having a size P on both sides. Further, the method also includes simultaneously filtering the first and a second group of time domain samples with a linear FIR filter having a tap length L equal to two times the size P.

The above-proposed method may also be performed by a computer program embodied in a non-transitory computer readable storage medium.

In the foregoing specification, the proposed solution has been described regarding specific examples of embodiments of the proposed solution. It will, however, be evident that various modifications and changes may be made therein without departing from the broader scope of the proposed solution as set forth in the appended claims.

The invention claimed is:

1. A digital signal processor for processing a composite time domain signal having a plurality of parallel and independent signals that are arranged to collectively form a parallel communication, the composite time domain signal comprising at least a first time domain signal and a second time domain signal, the first time domain signal being an OFDM signal formed by at least a first OFDM symbol and a second OFDM symbol which are contiguous to each other at a first transition time boundary, the composite time domain signal corresponding to a time domain representation of a composite frequency domain signal extending over a given frequency band configured to be associated with the parallel communication and which is arranged into at least a first frequency sub-band and a second frequency sub-band which are adjacent to each other and which are respectively associated with the first time domain signal and the second time domain signal, the digital signal processor comprising:
a first extractor arranged to extract a first predetermined plurality of time domain samples of the first time domain signal which are located on either side of the first transition time boundary,
a first filter operably coupled to the first extractor and arranged to filter the first extracted time domain samples, thereby creating first filtered time domain samples, and
a first replacer operably coupled to the first filter and arranged to replace, in the first time domain signal, the first extracted time domain samples with the first filtered time domain samples.

2. The digital signal processer of claim 1 wherein:
the composite frequency domain signal is a multicarrier signal formed by a plurality of subcarriers,
the second time domain signal is an OFDM signal formed by at least a third OFDM symbol and a fourth OFDM symbol which are contiguous to each other at a second transition time boundary, and
the first time domain signal and the second time domain signal exhibit at least one different operating parameter,
the digital signal processer further comprising,
a second extractor extracting unit arranged to extract a second predetermined plurality of time domain samples of the second time domain signal which are located on either side of the second transition time boundary,
a second filter operably coupled to the second extractor and arranged to filter the second extracted time domain samples, thereby creating second filtered time domain samples, and
a second replacer operably coupled to the second filter and arranged to replace, in the second time domain signal, the second extracted time domain samples with the second filtered time domain samples.

3. The digital signal processer of claim 2 wherein the operating parameter comprises at least one of: a subcarrier spacing, a cyclic prefix length, a sub-frame duration, a transmission time interval and a fast Fourier transform length.

4. The digital signal processer of claim 2 further comprising:
a window shaper arranged to window shape with a smooth tapered window function, in the time domain, the first and second filtered time domain samples, thereby creating first tapered time domain samples,
the window shaper being further arranged to window shape with an inverse function of the smooth tapered window function, in the time domain, the first and second extracted time domain samples, thereby creating second tapered time domain samples,
an adder operably coupled to the window shaper and arranged to add in a weighted manner, in the time domain, the first tapered time domain samples with the second tapered time domain samples, thereby creating combined tapered time domain samples,
the first replacer and/or the second replacer operably coupled to the adder and further arranged to replace, respectively, in the first time domain signal and/or the second time domain signal, the extracted time domain samples or the filtered time domain samples with the combined tapered time domain samples.

5. The digital signal processer of claim 2 further comprising:
the first extractor and/or second extractor being further arranged to respectively extract all the time domain samples of the first time domain signal and/or second time domain signal,
a window shaper being further arranged to window shape with a smooth tapered window function, in the time domain, the first and second extracted time domain samples which are associated to each OFDM symbol, thereby creating third tapered time domain samples,
the window shaper being further arranged to window shape with an inverse function of the smooth tapered window function, in the time domain, the first and second filtered time domain samples, thereby creating fourth tapered time domain samples,
an adder operably coupled to the window shaper and arranged to add in a weighted manner, in the time domain, the fourth tapered time domain samples with the third tapered time domain samples, thereby creating combined tapered time domain samples,
the first replacer and/or the second replacer operably coupled to the adder and further arranged to replace, in the first time domain signal and/or the second time domain signal, all the time domain samples with the respective combined tapered time domain samples.

6. The digital signal processer of claim 4 wherein the smooth tapered window function is symmetrical about the vertical centerline and is selected from among the following window functions: raised-cosine, trapezoidal, cosine and Tukey.

7. The digital signal processer of claim 2, wherein the first and second extracted time domain samples are so arranged to comprise a first and a second group of time domain samples, the first group being located around the first transition time boundary and/or the second transition time boundary and having a sample size Q, the second group being located on either side of the first group and having a sample size P on both sides, and wherein, the first filter and/or second filter is further arranged to simultaneously filter the first and a second group of time domain samples with a linear Finite Impulse Response, FIR, filter having a tap length L equal to two times the first group sample size P.

8. The digital signal processor of claim 7 wherein the first group of time domain samples is arranged such that the time domain samples are centered on the first transition time boundary and/or the second transition time boundary.

9. The digital signal processor of claim 7 wherein the first group of time domain samples is arranged such that the time domain samples are distributed in an asymmetrical manner around the first transition time boundary and/or the second transition time boundary.

10. A transmitting device for a wireless communication system comprising at least two parallel transmitting chains that are arranged to collectively form a parallel communication system wherein:

at least one of the parallel transmitting chains is an OFDM transmitting chain, and each of the parallel transmitting chain comprises a digital signal processor according to claim 1.

11. A method of processing a composite time domain signal having a plurality of parallel and independent signals that collectively form a parallel communication, the composite time domain signal comprising at least a first time domain signal and a second time domain signal, the first time domain signal being an OFDM signal formed by at least a first OFDM symbol and a second OFDM symbol which are contiguous to each other at a first transition time boundary, the composite time domain signal corresponding to a time domain representation of a composite frequency domain signal extending over a given frequency band configured to be associated with the parallel communication and which is arranged into at least a first frequency sub-band and a second frequency sub-band which are adjacent to each other and which are respectively associated with the first time domain signal and the second time domain signal, the method comprising:

extracting a first predetermined plurality of time domain samples of the first time domain signal which are located on either side of the first transition time boundary, filtering the first extracted time domain samples, thereby creating first filtered time domain samples, and replacing, in the first time domain signal, the first extracted time domain samples with the first filtered time domain samples.

12. The method of claim 11 wherein:

the composite frequency domain signal is a multicarrier signal formed by a plurality of subcarriers, the second time domain signal is an OFDM signal formed by at least a third OFDM symbol and a fourth OFDM symbol which are contiguous to each other at a second transition time boundary, and the first time domain signal and the second time domain signal exhibit at least one different operating parameter, the method further comprising, extracting a second predetermined plurality of time domain samples of the second time domain signal which are located on either side of the second transition time boundary, filtering the second extracted time domain samples, thereby creating second filtered time domain samples, and replacing, in the second time domain signal, the second extracted time domain samples with the second filtered time domain samples.

13. The method of claim 11 further comprising:

window shaping with a smooth tapered window function, in the time domain, the filtered time domain samples, thereby creating first tapered time domain samples window shaping with an inverse function of the smooth tapered window, function, in the time domain, the extracted time domain samples, thereby creating second tapered time domain samples, adding in a weighted manner, in the time domain, the first tapered time domain samples with the second tapered time domain samples, thereby creating combined tapered time domain samples, and replacing, in the first time domain signal, the extracted time domain samples or the filtered time domain samples with the combined tapered time domain samples.

14. The method of claim 12 wherein the first and second extracted time domain samples are so arranged to comprise a first and a second group of time domain samples, the first group being located around the first transition time boundary and/or the second transition time boundary and having a sample size Q, the second group being located on either side of the first group and having a sample size P on both sides, the method further comprising:

simultaneously filtering the first and a second group of time domain samples with a linear Finite Impulse Response, FIR, filter having a tap length L equal to two times the first group sample size P.

15. The method of claim 11 further comprising:

extracting all the time domain samples of the first time domain signal and/or second time domain signal, window shaping with a smooth tapered window function, in the time domain, the first and second extracted time domain samples which are associated to each OFDM symbol, thereby creating first tapered time domain samples, window shaping with an inverse function of the smooth tapered window function, in the time domain, the first and second filtered time domain samples, thereby creating second tapered time domain samples, adding in a weighted manner, in the time domain, the first tapered time domain samples with the second tapered time domain samples, thereby creating combined tapered time domain samples, replacing, in the first time domain signal and/or the second time domain signal, all the time domain samples with the respective combined tapered time domain samples.

* * * * *